United States Patent [19]

Hoffmann

[11] Patent Number: 5,040,120
[45] Date of Patent: Aug. 13, 1991

[54] CIRCUIT CONFIGURATION FOR A VEHICLE EXHIBITING TRACTION SLIP CONTROL

[75] Inventor: Ralph Hoffmann, Wiesbaden, Fed. Rep. of Germany

[73] Assignee: Alfred Teves GmbH, Frankfurt am Main, Fed. Rep. of Germany

[21] Appl. No.: 423,819

[22] Filed: Oct. 18, 1989

[30] Foreign Application Priority Data

Oct. 28, 1988 [DE] Fed. Rep. of Germany ....... 3836680

[51] Int. Cl.$^5$ .................................................. B60T 8/32
[52] U.S. Cl. .......................... 364/426.03; 364/426.02; 180/197; 303/103
[58] Field of Search ...................... 364/426.03, 426.02; 303/95, 100, 106, 103; 180/197

[56] References Cited

U.S. PATENT DOCUMENTS

| | | | |
|---|---|---|---|
| 4,583,611 | 4/1986 | Frank et al. .................... | 364/426.02 |
| 4,693,522 | 9/1987 | Wupper et al. ................ | 364/426.02 |
| 4,701,855 | 10/1987 | Fennel .................................. | 180/197 |
| 4,702,337 | 10/1987 | Burckhardt et al. ................ | 180/197 |
| 4,733,920 | 3/1988 | Pannbacker . | |

FOREIGN PATENT DOCUMENTS

| | | |
|---|---|---|
| 0180721 | 7/1985 | European Pat. Off. . |
| 2136440 | 2/1973 | Fed. Rep. of Germany ...... 303/106 |
| 2814479 | 10/1978 | Fed. Rep. of Germany ...... 303/106 |
| 3345730 | 6/1985 | Fed. Rep. of Germany . |
| 3612170 | 10/1987 | Fed. Rep. of Germany . |
| 3644139 | 7/1988 | Fed. Rep. of Germany . |
| 1248788 | 10/1971 | United Kingdom . |
| 1286774 | 8/1972 | United Kingdom . |
| 1492024 | 11/1977 | United Kingdom . |
| 2151732 | 7/1985 | United Kingdom . |

*Primary Examiner*—Parshotam S. Lall
*Assistant Examiner*—Gary Yacura
*Attorney, Agent, or Firm*—Robert P. Seitter; J. Gordon Lewis

[57] ABSTRACT

A circuit configuration for automotive vehicles with traction slip control, by which traction slip control signals are derived from sensor signals of the driven and the non-driven wheels. Circuits for detecting roadway obstructions and for suppressing control actions in consequence of these roadway obstructions, disable the traction slip control or reduce the sensitivity of the traction slip control or reduce the sensitivity of the traction slip control for a predetermined period of time (T) upon the occurrence of positive slip on a non-driven wheel and/or in the event of acceleration of a non-driven wheel. When a control in which a vehicle reference speed ($V_{Ref}$) is formed, the vehicle reference speed is increased for a predetermined period of time for the purpose of suppressing undesirable control actions.

6 Claims, 2 Drawing Sheets

$a_{Rad}$ =
$k_1$ =
A =
$V_{Ref}$ =
$k_2$ =
$K_3$ =
$T_s$ = $\dfrac{Am \times k_2}{m/s}$

CIRCUIT CONFIGURATION FOR A VEHICLE EXHIBITING TRACTION SLIP CONTROL

BACKGROUND OF THE INVENTION

The present invention relates to a circuit configuration for an automotive vehicle with traction slip control and in which traction slip control signals, including braking-pressure control signals and/or drive motor control signals, are derivable from sensor signals which represent the rotational behavior of the driven and the non-driven wheels.

In such control circuits, the information required for controlling the braking pressure and/or the vehicle drive motor are derived exclusively or predominantly from the rotational behavior of the individual vehicle wheels. Wheel sensors are available for this purpose, the output signals of which are evaluated and logically combined in an electronic circuit configuration. To accomplish an optimal traction slip control, a circuit configuration is required which reacts as sensitively and rapidly as possible to variations in the wheel rotational behavior being indicative of an unstable condition or an excessive amount of traction slip. However, to eliminate inevitable errors and tolerances, for example, in the measurement system and in the signal-processing system, the control must not respond until predetermined threshold values are exceeded. Additionally, uneven road conditions, bumpers, road holes and the like, cause variations in the wheel rotational behavior, chassis vibrations or axle vibrations which can initiate undesirable control actions and which cannot be eliminated by filter circuits or by augmenting the response threshold values without adverse effects on the control quality.

A method and a circuit configuration for suppressing undesirable control actions in anti-lock brake systems, which can be caused e.g. by chassis vibrations or axle vibrations, wherein a threshold value decisive for the initiation of the control is varied. The re-acceleration of the controlled wheel is known from German published patent application 33 45 729 (corresponding to U.S. Pat. No. 4,701,855). A wheel deceleration subsequent to re-acceleration of the same wheel is interpreted as an indication of a roadway obstruction, and a brake slip control action is prevented from being initiated due to this deceleration period.

An object of the instant invention is to improve the control quality of a circuit configuration for an automotive vehicle with traction slip control. Without curtailing the sensitivity of the control circuitry and the time of response to wheel lock tendencies, it is also an object to avoid that control actions are triggered by roadway obstructions.

SUMMARY OF THE INVENTION

It has been found that this object is achieved in a progressive manner in a circuit configuration of the type initially referred to in that circuits are provided for detecting roadway obstructions and for suppressing control actions in consequence of these roadway obstructions. These circuits disable the traction slip control or reduce the sensitivity of the traction slip control for a predetermined period of time upon the occurrence of positive slip on a non-driven wheel and/or in the event of acceleration of a non-driven wheel which is more than the vehicle acceleration. When a vehicle reference speed is formed by way of the circuit configuration taking into account the sensor signals, which vehicle reference speed serves as a reference value for generating the control signals, the circuits also can be designed such that, for suppressing control actions in consequence of roadway obstructions, upon the occurrence of positive slip on a non-driven wheel, the vehicle reference speed is increased for a predetermined period of time by a value corresponding to the amount of slip. This measure is particularly useful for vehicles with rear-wheel drive.

According to the present invention, the measurement of positive slip on a non-driven wheel is estimated as a criterion for driving over a roadway obstruction, and the corresponding signal is used for suppressing a control action caused by this roadway obstruction. According to an advantageous embodiment of this invention, the predetermined period of time is variable as a function of the vehicle speed and is dictated by the distance between the front axle and the rear axle of the vehicle. In this predetermined period of time, the vehicle covers a distance which corresponds approximately to the axle distance. This predetermined period of time can be found according to the correlation:

$$T(ms) = \frac{A(m)}{V_F(m/s) \cdot 10^3} + K(ms),$$

where A represents the distance between the axles of the vehicle, $V_F$ represents the vehicle speed and K is a time constant, in the course of which the obstruction may fade away.

BRIEF DESCRIPTION OF THE DRAWING

Further features, advantages and applications of the present invention are described in the following description of preferred embodiments with reference to the accompanying drawing in which.

DETAILED DESCRIPTION

Figure 1:
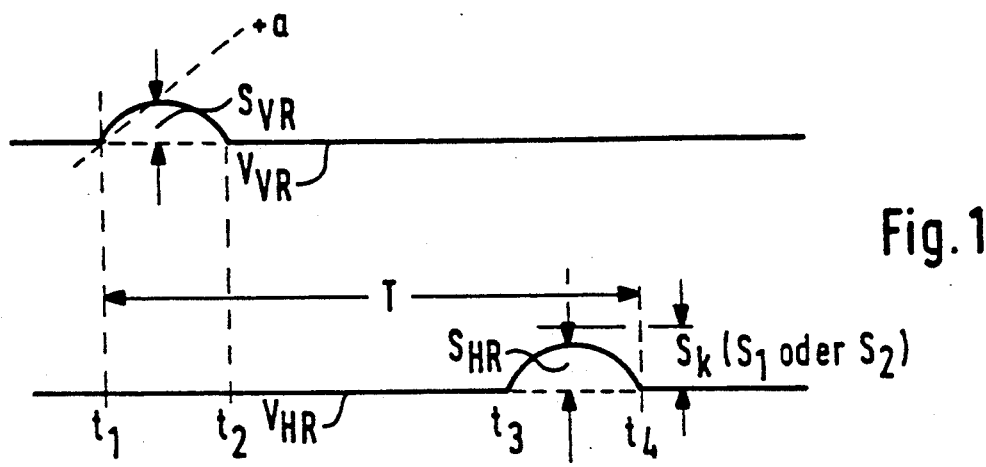
FIG. 1 is a schematically simplified view of the variation of the front-wheel and rear-wheel speed due to a roadway obstruction on a vehicle with rear-wheel drive.

The diagram according to FIG. 1 explains the mode of operation of the circuit configuration in accordance with the present invention in use on an automotive vehicle with rear-wheel drive. The rotational speed of a front wheel VR and a rear wheel HR of an automotive vehicle are illustrated which, one after the other, pass by the same roadway obstruction, for instance a bumper. This obstacle first influences the speed variations $v_{VR}$ of the front wheel VR in the period of time between $t_1$ and $t_2$. A positive acceleration $+a$ which is greater than the vehicle acceleration is imparted to the wheel by this obstacle. The positive slip in consequence of the roadway obstruction maximally adopts the value $S_{VR}$. Since a vehicle with rear-wheel drive is concerned, only a roadway obstruction can cause positive slip of the front wheel VR. Therefore, traction slip control will not be activated by the measured variables +a and $S_{VR}$ of the non-driven front wheel.

The roadway obstruction described above which takes effect on the run of the front wheel in the period of time $t_1$ to $t_2$ will likewise influence the speed of the driven rear wheel HR after a predetermined period of time, namely from $t_3$ to $t_4$, and will result in corresponding (superimposed, under certain circumstances) positive acceleration values and slip values on the rear wheel. The period of time between the occurrence of the obstruction on the front wheel ($t_1$ to $t_2$) and on the rear wheel ($t_3$ to $t_4$), however, is inevitably dictated by the distance between the axles of the vehicle and the vehicle speed. Hence, observance of this regularity permits recognition of a wheel speed variation that is caused by a roadway obstruction and to distinguish it from variations having a different cause. This is because traction slip control is desired to be activated by a positive slip and/or a positive acceleration on the controlled rear wheel HR, provided these values exceed the predefined limit values and provided they are not due to roadway obstructions, but to excessive driving power. In contrast thereto, triggering of control actions due to roadway obstructions is not desirable and must be suppressed.

The inventive circuit configuration in accordance with the present invention is based on the consideration that a roadway obstacle can be assumed when a similar variation can be measured during forward driving first on the front wheels and, subsequently, after a period of time dictated by the distance between the axles and the vehicle speed on the rear wheels. This is because first the front wheels and, after the distance between the axles is overcome, the rear wheels will pass by this obstacle. When this obstacle is detected, the traction slip control is temporarily disabled or the response sensitivity is considerably diminished for a period of time T by means of the circuit configuration in accordance with the present invention in the example according to FIG. 1. The period of time T can be defined by the correlation:

$$T = \frac{A \times k}{V_F} \text{ or } T(ms) = \frac{A(m)}{V_F(m/s)10^3} + K(ms),$$

where A represents the distance between the axles of the vehicle, $V_F$ represents the vehicle speed and K is a time constant which is determined by the fading away of the disturbance. No traction slip control action is admitted within the time T, unless the slip S on the controlled rear wheel is greater than $S_k$ and unless there is a positive acceleration on the (non-driven) front wheel VR.

The critical slip value $S_k$ depends on the vehicle speed in one embodiment of the present invention. For instance, a predefined slip $S_1$ is still admitted in the presence of a vehicle speed between zero and $V_1$ and a predetermined higher slip value $S_2$ is still admitted in the presence of a speed in excess of $V_1$ on the controlled rear wheel. Of course, a subdivision into several slip values as a function of the vehicle speed is also possible.

After a predefined duration which is ascertained by the variable k or K, depending on the respective formula, the disturbance caused by the roadway obstruction will fade away again.

Figure 2:
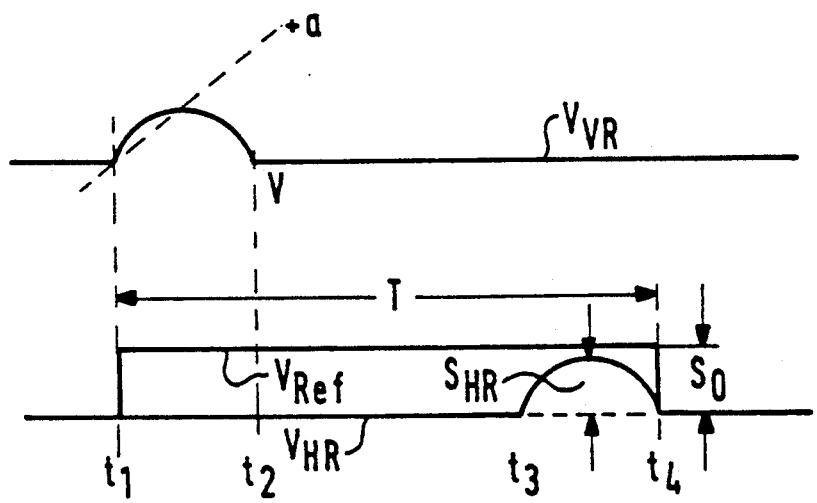
FIG. 2 shows in a similar illustration as in FIG. 1 the same event in a circuit configuration with a rise in the vehicle reference speed.

In the embodiment according to FIG. 2, which is also with reference to a vehicle with rear-wheel driven and to the same disturbing situation as in FIG. 1, the so-termed vehicle reference speed $V_{Ref}$ is raised at the point of time $t_1$ for the period of time T. That is, a circuit configuration is employed, wherein first a vehicle reference speed is formed as a reference quantity for producing the traction slip control signals. This is usually done by logically combining the signals supplied by the wheel sensors, and possibly by including additional sensor signals. By raising the reference speed, see lower curve $V_{Ref}$ in FIG. 2, the traction slip control will not even respond upon the occurrence of positive slip $S_{HR}$ on the driven wheel, as is the case in the period of time between $t_3$ and $t_4$. However, further increase of the traction slip, namely, in excess of the value $S_o$ given by the increase of the vehicle reference speed, would trigger the control. Further, the rise of the reference speed $V_{Ref}$ analogously to the embodiment according to FIG. 1, in turn, can be influenced by the vehicle speed.

Figure 3:
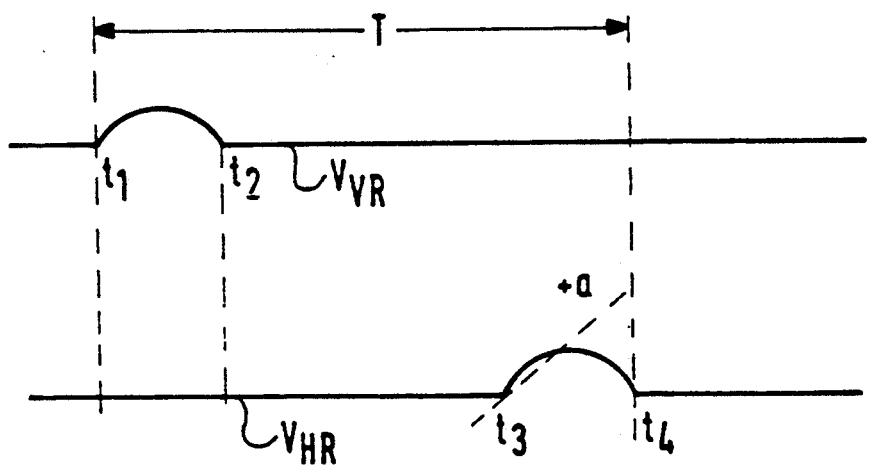
FIG. 3 shows in a similar illustration as in FIG. 1 the same event but on a vehicle with front-wheel drive; and, FIG. 4 shows in a simplified diagram view the inventively essential circuitries of a circuit configuration according to the present invention.

FIG. 3 relates to a vehicle with front-wheel drive. Here, again, the occurrence of positive acceleration signals and of positive slip on the front wheel VR and on the rear wheel HR in the distance T indicates roadway obstructions. As in the embodiment according to FIG. 1, a corresponding reduction of the response sensitivity is also of advantage, although the reduction of the speed of response is performed somewhat delayed in comparison to rear-wheel driven vehicles because it is the controlled wheel which first passes the obstacle. In the event of periodic roadway obstructions, the attainable improvement of the traction slip control is practically the same as in vehicles with rear-wheel drive.

Figure 4:
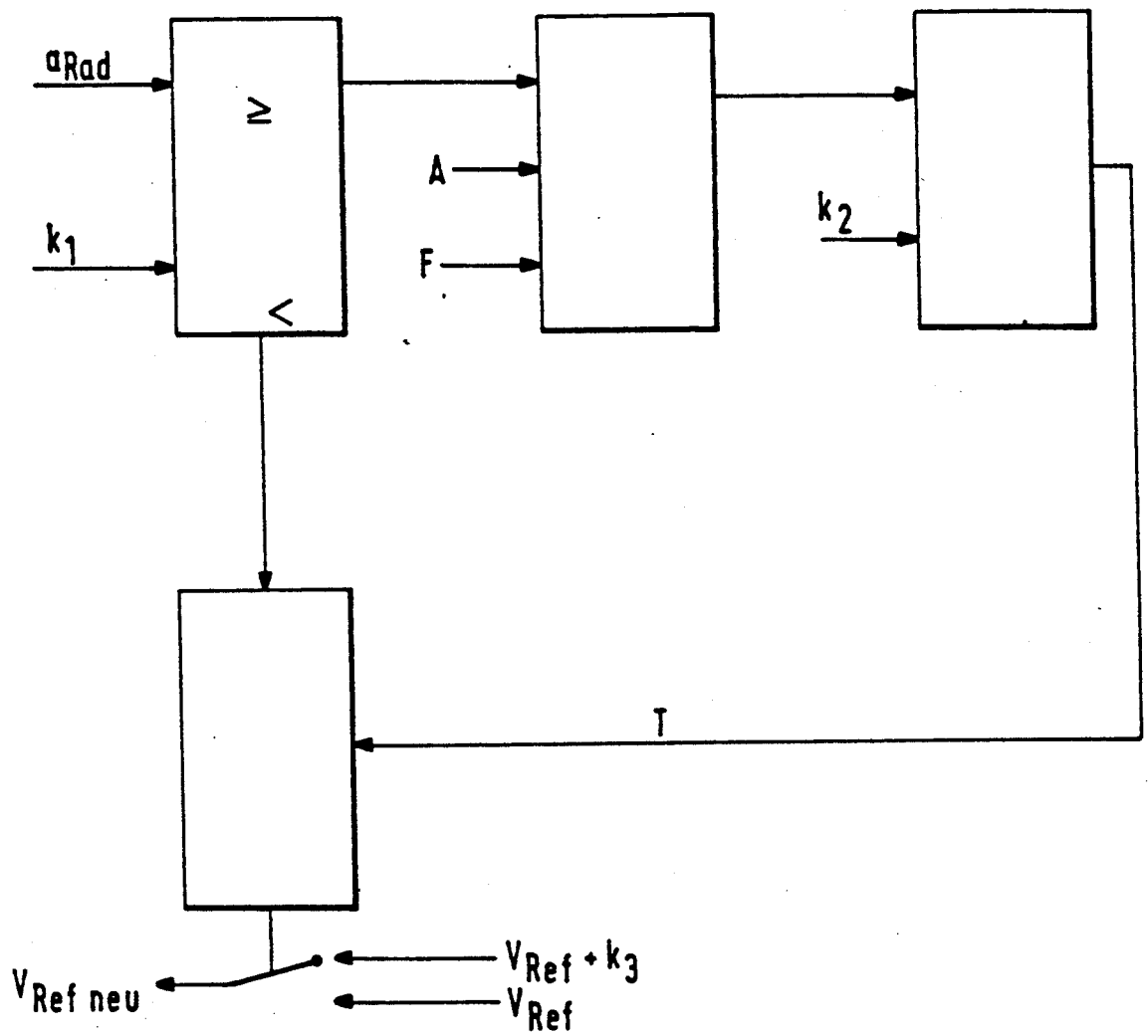

The embodiment of a circuit configuration according to FIG. 4 serves to raise the vehicle speed or the vehicle reference speed $V_{Ref}$ by an amount $K_3$ in the case of a roadway obstruction. A vehicle with rear-wheel drive and the design described by way of FIG. 2 are referred to in FIG. 4.

With the aid of a comparator 1, first the wheel acceleration a is compared with a predetermined acceleration threshold $K_1$. If $a_{Rad}$ is greater than, or equal to, $K_1$, a timer 4 is set by way of a divider 2 and a multiplier 3 according to the correlation:

$$T(ms) = \frac{A(m)K_2}{V_F(m/s) \cdot 10^3}$$

This timer comprises a C-element with a capacitor that is charged according to this correlation. When the capacitor has been discharged via a resistor R (in the period of time T), the circuitry resets to normal vehicle speed or vehicle reference speed. If the wheel acceleration $a_{Rad}$ is less that $k_1$, an output signal of the comparator 1 sets the timer 4 to zero and/or the capacitor of the RC-element is discharged.

What is claimed is:

1. A circuit configuration for an automotive vehicle with traction slip control by which traction slip control signals, including braking-pressure control signals or drive motor control or both, are derivable from sensor signals which represent the rotational behavior of the driven and the non-driven wheels, wherein circuit means are provided for detecting roadway obstructions and for suppressing control actions in response to said roadway obstructions, said circuits disable the traction slip control or reduce the sensitivity of the traction slip control for a predetermined period upon the occurrence of positive slip on a non-driven wheel greater than the vehicle acceleration wherein the predetermined period is a function of vehicle speed and the distance between the respective vehicle axles.

2. A circuit configuration for a rear-wheel driven automotive vehicle with traction slip control by which traction slip control signals including braking-pressure control signals or driven motor control signals or both, are derivable from sensor signals which represent the rotational behavior of the driven and the non-driven wheels, a vehicle reference speed being formed from the sensor signals which serves as a reference value for generating the control signals, wherein a means for suppressing control actions in response to roadway obstructions, including circuit means which, upon the occurrence of positive slip on a non-driven wheel, increase the vehicle reference speed ($V_{Ref}$) for a predetermined period of time by a value corresponding to the amount of slip wherein the predetermined period is a function of vehicle speed and the distance between the respective vehicle axles.

3. A circuit configuration for a rear-wheel driven automotive vehicle with traction slip control by which traction slip control signals including braking-pressure control signals or driven motor control signals or both, are derivable from sensor signals which represent the rotational behavior of the driven and the non-driven wheels, a vehicle reference speed being formed from the sensor signals which serves as a reference value for generating the control signals, wherein a means for suppressing control actions in response to roadway obstructions including circuit means which, upon the occurrence of positive slip on a non-driven wheel, increase the vehicle reference speed ($V_{Ref}$) for a predetermined period of time by a value corresponding to the amount of slip, and wherein the predetermined period of time (T) is variable as a function of the vehicle speed and as a function of the distance (A) between the front axle and the rear axle.

4. A circuit configuration as claimed in claim 3, wherein the predetermined period of time (T), the vehicle covers a distance which corresponds approximately to the axle distance (A).

5. A circuit configuration for an automotive vehicle with traction slip control by which traction slip control signals, including braking-pressure control signals or driven motor control signals or both, are derivable from sensor signals which represent the rotational behavior of the driven and the non-driven wheels, wherein circuit means are provided for detecting roadway obstructions and for suppressing control actions in response to said roadway obstructions, said circuits disable the traction slip control or reduce the sensitivity of the traction slip control for a predetermined period upon the occurrence of positive slip on a non-driven wheel which is more than the vehicle acceleration, and wherein the predetermined period of time (T) is derived according to the correlation:

$$T(ms) = \frac{A(m)}{V_F(m/s) \cdot 10^3} + K(ms),$$

where A represents the distance between the axles of the vehicle, $V_F$ represents the vehicle speed and K is a time constant.

6. The circuit configuration as claimed in claim 5, wherein said time constant K represents the time in which the disturbance caused by the roadway obstructions will cease.

* * * * *